United States Patent
Shipman, Jr.

(10) Patent No.: US 11,538,125 B1
(45) Date of Patent: Dec. 27, 2022

(54) AUTOMATED EVENT DETECTION IN CONTROLLED-ENVIRONMENT AREAS USING BIOMETRIC IDENTIFICATION

(71) Applicant: Tech Friends, Inc., Jonesboro, AR (US)

(72) Inventor: Bobby L. Shipman, Jr., Jonesboro, AR (US)

(73) Assignee: TECH FRIENDS, INC., Jonesboro, AR (US)

(*) Notice: Subject to any disclaimer, the term of this patent is extended or adjusted under 35 U.S.C. 154(b) by 856 days.

(21) Appl. No.: 16/364,099

(22) Filed: Mar. 25, 2019

Related U.S. Application Data

(63) Continuation-in-part of application No. 15/860,637, filed on Jan. 2, 2018, now Pat. No. 10,242,417, which is a continuation of application No. 15/252,695, filed on Aug. 31, 2016, now Pat. No. 9,858,632.

(51) Int. Cl.
  *G06Q 50/26* (2012.01)
  *G07C 9/37* (2020.01)
  *H04R 29/00* (2006.01)
  *G06Q 10/10* (2012.01)

(52) U.S. Cl.
  CPC ......... *G06Q 50/26* (2013.01); *G06Q 10/1091* (2013.01); *G07C 9/37* (2020.01)

(58) Field of Classification Search
  CPC .................................................. G07F 19/202
  See application file for complete search history.

(56) References Cited

U.S. PATENT DOCUMENTS

| | | | | |
|---|---|---|---|---|
| 2011/0213618 A1* | 9/2011 | Hodge | ............... | G07F 19/20 705/1.1 |
| 2012/0154117 A1* | 6/2012 | Nice | ............... | H04L 63/0861 340/5.82 |
| 2013/0261490 A1* | 10/2013 | Truccolo | ............... | A61B 5/375 600/544 |
| 2014/0359722 A1* | 12/2014 | Schultz | ............... | H04L 63/0861 726/5 |
| 2019/0103012 A1* | 4/2019 | Daoura | ............... | G08B 21/023 |

* cited by examiner

*Primary Examiner* — Joseph H Feild
*Assistant Examiner* — Pameshanand Mahase
(74) *Attorney, Agent, or Firm* — Schrantz Law Firm, PLLC; Stephen D. Schrantz

(57) ABSTRACT

Systems and methods for automated event detection of controlled-environment facility residents, such as identification of potential dangers and/or issues concerning correctional facility inmates. The system and method employs at least one biometric capture device or mechanism disposed within a controlled-environment area configured to capture biometrics of residents of the controlled-environment facility within the controlled-environment area. A controlled-environment facility administration and management system, or the like, is configured to enroll key biometric identification biometric features of residents of the controlled-environment facility and compare captured biometrics of the residents to enrolled key biometric features of residents of the controlled-environment facility to identify the resident. The system also identifies parameters that define an occurrence of an event. The system monitors the conditions within the facility to detect the occurrence of such an event.

27 Claims, 4 Drawing Sheets

AUTOMATED EVENT DETECTION IN CONTROLLED-ENVIRONMENT AREAS USING BIOMETRIC IDENTIFICATION

CROSS-REFERENCE TO RELATED APPLICATIONS

This application claims priority to and is a continuation in part of U.S. patent application Ser. No. 15/860,637 entitled "Automated Resident Check-ins in controlled-environment Areas Using Biometric identification" that was filed on Jan. 2, 2018 which is a continuation of U.S. patent application Ser. No. 15/252,695 entitled "Automated Resident Check-ins in controlled-environment Areas Using Biometric identification" that was filed on Aug. 31, 2016 that issued as U.S. Pat. No. 9,858,632 on Jan. 2, 2018.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

TECHNICAL FIELD

The present disclosure relates generally to controlled-environment facilities, more particularly to check-in of residents in controlled-environment areas, and particularly to automated resident check-ins in controlled-environment areas using biometric identification.

BACKGROUND

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), day care centers, babysitter arrangements, child care facilities, elder day care facilities or sites, and the like.

For example, inmates convicted of felony offenses generally serve long sentences in prison (e.g., federal or state prisons), whereas those convicted of misdemeanors receive shorter sentences to be served in jail (e.g., county jail). In either case, while awaiting trial, a suspect or accused may remain incarcerated.

In controlled-environment facilities, correctional facilities for example, inmates are traditionally visually identified multiple times per day to ensure that no person has escaped. These inmate counts are extremely time consuming and expensive for correctional facilities and provide little in the way of documentary proof of an inmate's presence. It is possible for an officer to simply overlook a person during a visual inspection, mistake one inmate for another, or even collude with a prisoner to allow an escapee time to flee the area. Also, due to the extreme time involved, inmate identification and check-ins are only done periodically which gives ample time for escapees to run away before the next scheduled check-in count. Moreover, over the past several years, sharp increases in inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often pressed to perform basic tasks such as inmate counts.

SUMMARY

The present invention is directed to systems and methods which provide for automated check-in for controlled-environment facility residents, such as correctional facility inmates. Therein, at least one biometric capture device disposed within a controlled-environment area, i.e. in an area in or associated with a controlled-environment facility. This biometric capture device may be configured to capture biometrics of residents of the controlled-environment facility within the controlled-environment area. A controlled-environment facility administration and management system, or the like, is configured to enroll key biometric identification features of residents of the controlled-environment facility and compare captured biometrics of the residents to enrolled key biometric features of residents of the controlled-environment facility to identify the resident. Whereupon the controlled-environment facility administration and management system, or the like, logs the presence of an identified resident as in the controlled-environment area at a time the biometrics of the identified resident were captured.

Mug shots of the residents of the controlled-environment facility may be used to enroll key biometric identification features of residents of the controlled-environment facility and/or key features of residents of the controlled-environment facility may be enrolled during a defined enrollment process. Such a defined enrollment process may be carried out at intake of the resident into the controlled-environment facility and/or may be an automated enrollment carried out by a controlled-environment facility resident communications kiosk and/or a personal controlled-environment facility resident media device hosting the biometric capture device disposed in the controlled-environment area.

Hence, a biometric capture device disposed in a controlled-environment area may be a part of a controlled-environment facility resident communications kiosk and/or may be mobile and a part of a personal controlled-environment facility resident media device. Therein, the controlled-environment facility resident communications kiosk and/or the personal controlled-environment facility resident media device may carry out comparing captured biometrics of the resident to enrolled key biometric features of residents of the controlled-environment facility to identify the resident. Also, the controlled-environment facility resident communications kiosk and/or the personal controlled-environment facility resident media device may log the presence of the resident whose biometrics were captured as in the controlled-environment area, with the controlled-environment facility administration and management system.

The capture of the biometrics of a resident of the controlled-environment facility may be carried out during a check-in procedure, wherein the resident presents his or her self to the biometric capture device. Again, the biometric capture device may be a part of a controlled-environment facility resident communications kiosk or a part of a personal controlled-environment facility resident media device. In this aspect, logging the presence of the resident whose biometrics were captured as in the controlled-environment area may include logging other biometric information of the resident and the resident's physical location within the controlled-environment area.

Also, capturing biometrics of residents of the controlled-environment facility using the biometric capture device disposed in the controlled-environment area may be carried out on a continual basis, and logging presence of residents captured in the biometrics as being in the controlled-environment area may be carried out periodically. A prompt may be issued for a resident to present his or her self to a biometric capture device. This prompt may be issued in response to the resident not having a valid check-in logged within a predefined period, and/or this the prompt may be issued at specified intervals according to facility rules. This prompt may be an email, text, alarm, phone call, other electronic, optical or acoustic signals, etc., issued to a controlled-environment facility resident communications kiosk in the controlled-environment area and/or a personal controlled-environment facility resident media device of the resident. Additionally or alternatively, the prompt may be an announcement issued over a public address system of the controlled-environment facility, or the like.

In some embodiments, an alert may be issued to an official associated with the controlled-environment facility in response to facility rules for required check-ins being violated with respect to a subject inmate. These alerts may take the form of an email, text, alarm, and/or phone call issued to the official.

Additionally or alternatively, key biometric features of officers of the controlled-environment facility may be enrolled and biometrics of an officer of the controlled-environment facility may be captured using a biometric capture device disposed in or in conjunction with the controlled-environment facility and/or various other controlled-environment areas. The captured biometrics of the officer may be compared to enrolled key biometric features of officers of the controlled-environment facility to identify the officer and the presence of the identified officer may be logged as in the vicinity of the biometric capture device at a time the biometrics were captured. A report of where the identified officer was at predetermined times may be generated therefrom.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
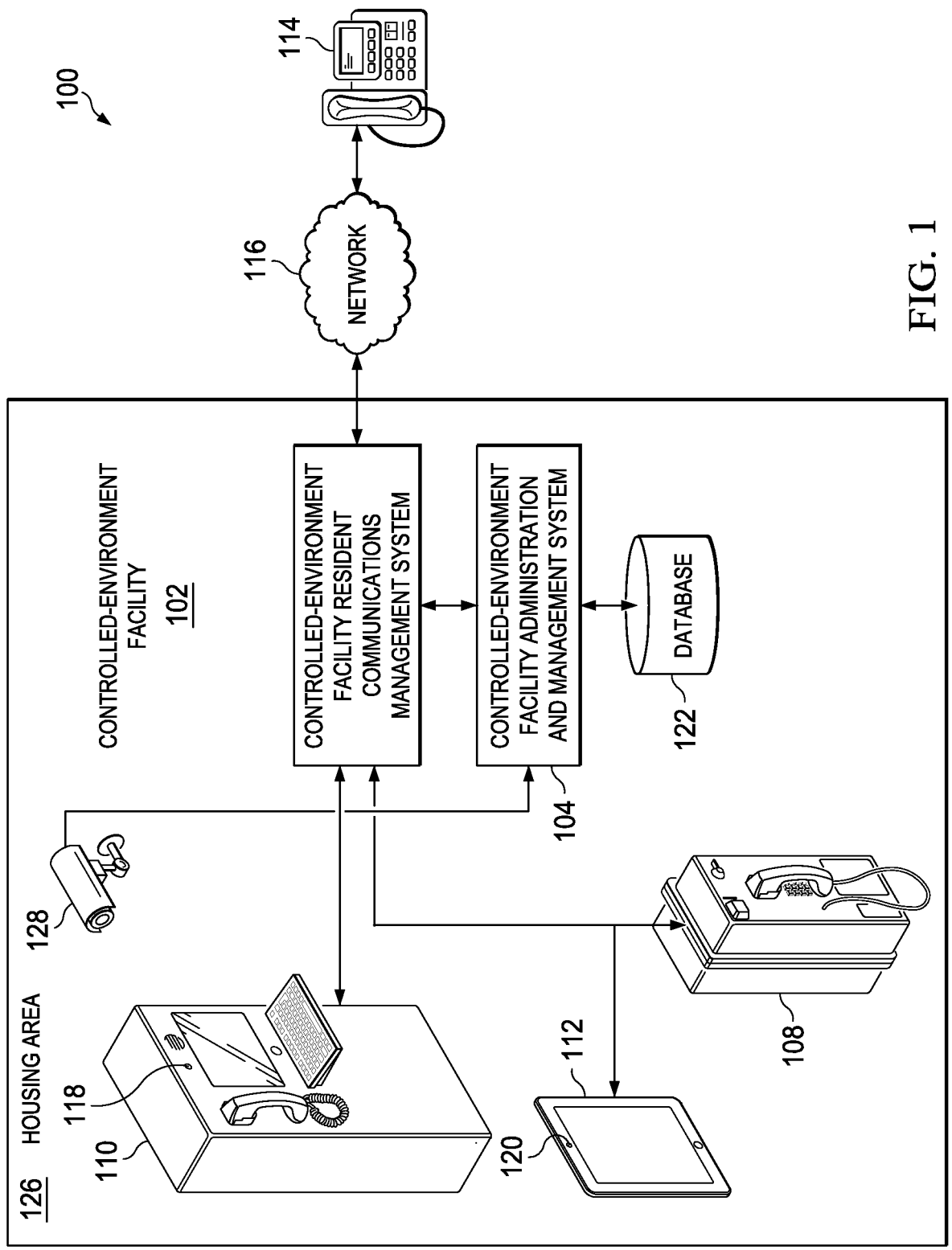
Figure 2:
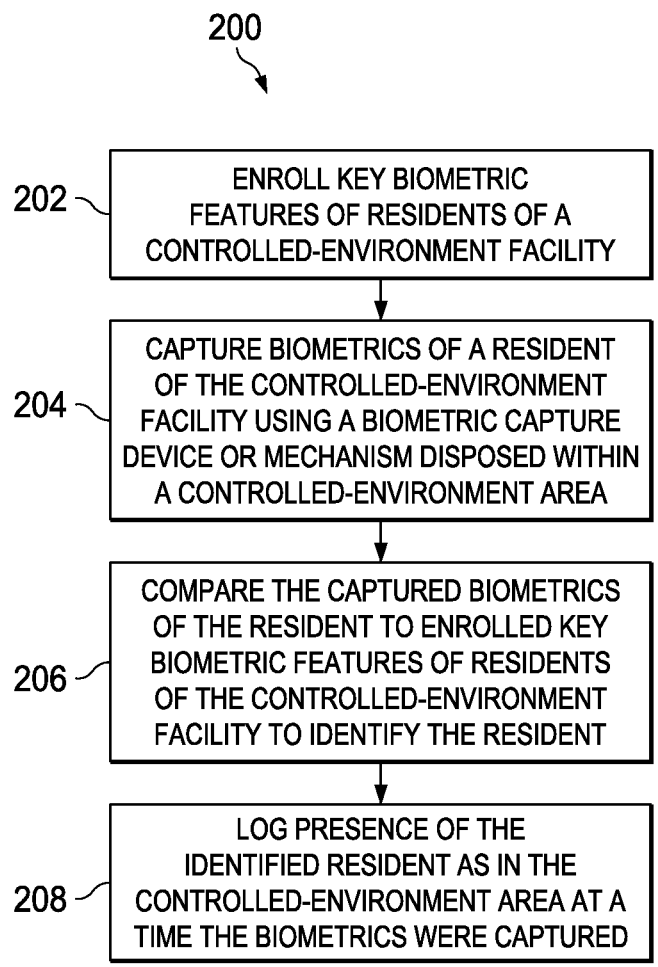
Figure 3:
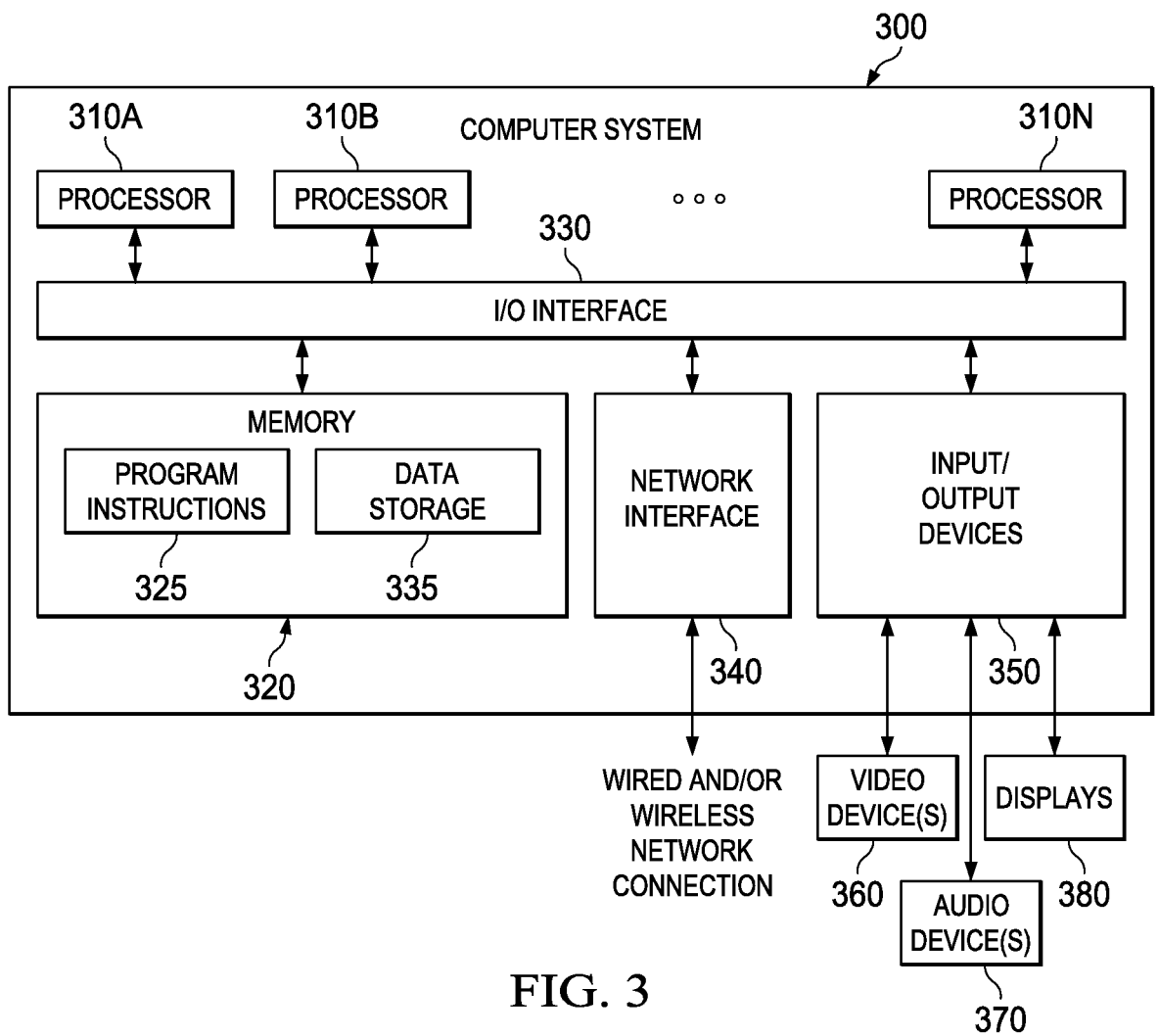
Figure 4:
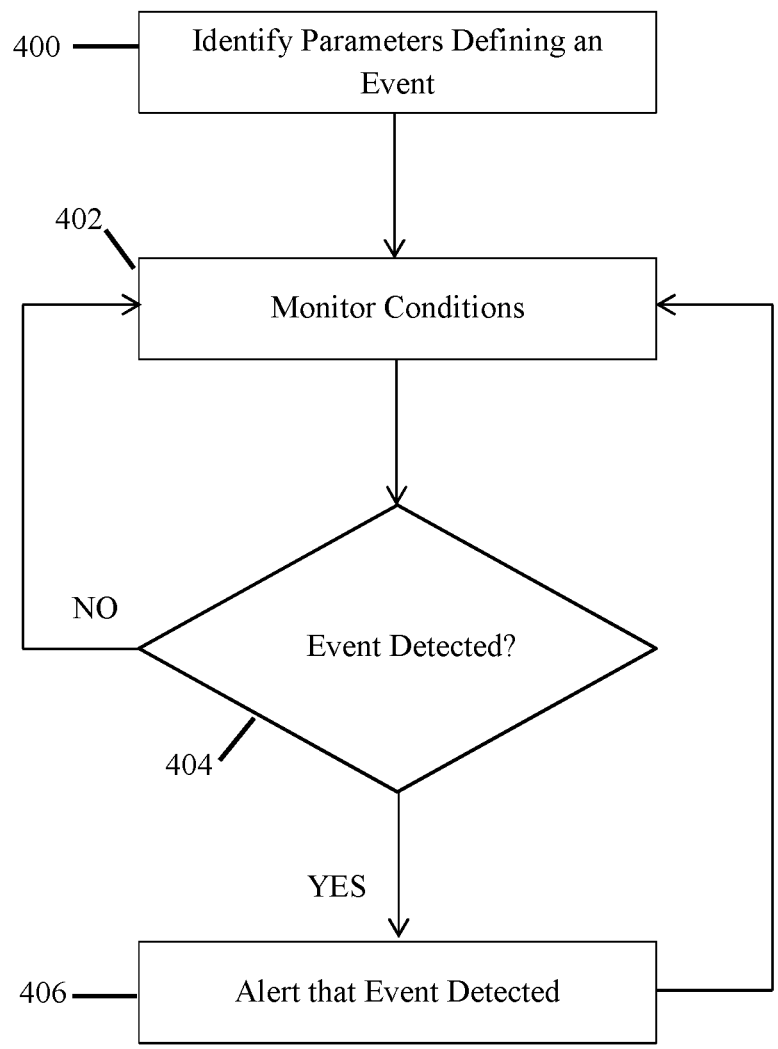

Having thus described the invention in general terms, reference will now be made to the accompanying drawings, which are not necessarily drawn to scale, and wherein:

FIG. 1 is a diagrammatic illustration of an example environment, wherein an example embodiment of the present systems and methods for automated resident check-ins in controlled-environment areas using biometric identification may be implemented, in accordance with some embodiments;

FIG. 2 is a flowchart of an example process for automated resident check-ins in controlled-environment areas using biometric identification, in accordance with some embodiments;

FIG. 3 is a block diagram of a computer system, device, station, or terminal configured to implement various techniques disclosed herein, according to some embodiments; and FIG. 4 is a flowchart of a process to detect the occurrence of an event, in accordance with some embodiments;

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to check-in of residents in controlled-environment areas, and particularly to automated resident check-ins in controlled-environment areas using biometric identification. In accordance with embodiments of the present systems and methods for automated check-in of controlled-environment facility residents, such as correctional facility inmates, at least one biometric capture device or mechanism disposed within a controlled-environment area is employed to capture biometrics of residents of the controlled-environment facility in the controlled-environment area. Such biometrics may include the resident's image, a recording of the resident's voice, a fingerprint scan, a thumbprint scan, a palm scan, an iris scan, voice recognition, gait analysis, heartbeat rhythm, acoustical biometrics, sound absorption of a body biometric, RF capture of a person, RF capture of reflections and/or absorptions of a person, a heat signature, or the like. Such RF capture implements radio frequency technology that detects radio frequency reflections and/or absorptions from a person via WIFI. The RF capture uses variations in WIFI signals to recognize human silhouettes through walls.

Embodiments of the present automated check-in of inmates of correctional facilities may use biometrics capture capabilities, such as video and/or digital image capture and/or sound recording capabilities, of controlled-environment facility resident communications kiosks and/or personal resident media devices. A controlled-environment facility administration and management system, or the like, is configured to pre-enroll key biometric identification features of residents of the controlled-environment facility and compare captured biometrics of the residents to enrolled key features of residents of the controlled-environment facility to identify the resident. Whereupon the controlled-environment facility administration and management system, or the like, logs the presence of an identified resident as in the controlled-environment area at a time the biometrics of the identified resident were captured.

Embodiments of the present systems and methods address the burden placed on correctional facilities to provide timely resident check-ins by improve the frequency and quality of resident counts while lowering costs. In accordance with embodiments of the present systems and methods a biometric capture device attached to a resident communications kiosk or mobile computing device is placed in a controlled-environment area, such as within a resident housing area, work area, or the like. A resident's key biometric features are identified and stored in a database or file system. This enrollment can be done from a resident's mug shots, other photos, a defined enrollment process, or even an automated enrollment by a kiosk or mobile computing device. Once enrolled, the resident may be required to check-in at periodic intervals. This check-in procedure could take the form of the resident presenting his or her self to a biometric capture device associated with a kiosk or mobile computing device and the device identifying him or her, automatically. The check-in is automatically logged into a facility database, possibly with other biometric information and/or photo as proof of resident identity. The resident's physical location may be logged as well. In some embodiments, the identification system could be fully automatic, constantly scanning the resident's housing, work or other environment, and periodically logging the resident's presence. It may not require active participation from the resident.

In the event a resident does not have a valid check-in for a predetermined period of time, such as may be defined by facility rules, a prompt might be generated in the form of an email, alarm, phone call, other electronic, optical or acoustic signals, etc. to trigger a manual verification of the resident's location.

Embodiments of the present systems and methods can also be used to log and report facility personnel presence within the controlled-environment facility. Often, a controlled-environment facility wants to track personnel, such as, for example, to confirm correctional officer patrols are being performed. Embodiments of the present systems and methods can track such an officer's movements within (and about) a correctional facility and produce reports on where the officer was at particular times throughout the day, in such an example. Embodiments of the present systems and methods can also be used in emergencies to identify the last known location for a person in a controlled-environment facility. For example, during riots, this system could identify which officers were present in dangerous areas of a correctional facility.

FIG. 1 is a diagrammatic illustration of example environment 100, wherein an example embodiment of the present systems and methods for automated resident check-ins in controlled-environment areas using biometric identification may be implemented with respect to controlled-environment facility 102, in accordance with some embodiments. Controlled-environment facility environment 100 may implement the illustrated embodiment of the present systems and methods through controlled-environment facility administration and management system 104, employing aspects of controlled-environment facility resident communications management system 106.

In some embodiments, controlled-environment facility 102 may allow a resident to make or receive phone calls using telephone 108, communications kiosk 110, personal resident media devices 112, or the like, via communication system 106. To that end, communication system 106 may include one or more analog switches, IP gateways, PBX systems, etc. that provide communications to controlled-environment facility 102. For example, a resident within controlled-environment facility 106 may use device 108, 110, 112, etc. to make a telephone call to (or to receive a telephone call from) a non-resident device 114 through network 116, which may be the public switched telephone network (PSTN), the Internet, wireless communications networks, or the like.

Further, residents may use communications kiosks 110, personal resident media devices 112, or the like to send and receive emails with non-residents, carryout video visitations with non-residents, exchange texts, or the like, via communication system 102. To this end, in some embodiments, communications kiosks or video visitation stations 110 may include a display or screen, a camera (118 or 120) and/or microphone, and a speaker and/or audio output. The camera (118 or 120) may be a digital video camera or the like, and may act as a biometric capture device or mechanism in accordance with embodiments of the present systems and methods. The screen may include a liquid crystal display (LCD), or other similar display. In some cases, the screen may include a touchscreen configured to accept data input from a user, and/or a keyboard, or the like, may be provided. Such a touchscreen may also act as a biometric capture device or mechanism to capture fingerprints, palm prints or the like. Additionally or alternatively, each video visitation station/kiosk 110 may include a handset or headset configured to perform audio input and/or output operations. A microphone of the kiosk (and/or handset or headset) may be employed in accordance with embodiments of the present systems and methods as a biometric capture device or mechanism. Moreover, in various embodiments, each video visitation station/kiosk 110 may also include a biometric sensor (e.g., thumbprint scanner, iris scanner, etc.), a radio frequency identification (RFID), a barcode scanner, or the like, for identifying a (resident) user. In some cases, a communications kiosk may assume the form of a computer, tablet computer, smart phone, etc., or any other consumer device or appliance with audio and/or video conferencing capabilities. For example, a tablet computing device may be mounted on a wall, in a hardened case and used as such a kiosk. Communications kiosks may replace typical pay phones found in some facilities and may provide touch screen computer functionality that enables a resident to perform "self-service" tasks such as setting up doctor appointments, scheduling visitation, viewing schedules, and checking the status of his or her case.

Personal resident media devices 112 may be a mobile device, such as a tablet computing devices, smartphones, media players, smart watches, wearable biometric devices, and/or the like, adapted and/or approved for use by residents of controlled-environment facility 106 (i.e. within the correctional facility). Such resident media devices may be particularly adapted for use in a controlled-environment facility, or the like and may be "stripped-down," particularly from the standpoint of what applications programs (apps) are provided or allowed on the device, and/or connectivity afforded the device. By way of example, such a resident media device may employ a modified operating system. For example, such a device may be adapted to only connect to a network provided by the controlled-environment facility, and/or in only certain locations, such as in controlled-environment areas in accordance with embodiments of the present systems and methods. This may be controlled by availability of WIFI access in certain areas, limited location-dependent access to a wireless communications network such as to only implement embodiments of the present systems and methods, or the like. Also, the resident media device may have a few, fixed apps pre-installed on the device, and installation of further apps on the device may be forbidden (i.e. prevented by modifications to the device's operating system, or the like) and/or restricted, such as by requiring permission from a facility administrator, or the like. As noted, in accordance with embodiments of the present systems and methods, personal resident media devices may be used to communicate with others, such as through phone calls, video calls, or the like (under control of controlled-environment facility resident communications management system 106).

Controlled-environment facility administration and management system 104 or similar functionality incorporated into and/or associated with controlled-environment facility environment 100 may electronically monitor and/or censor content of resulting electronic communications, in an automated manner such as for investigative purposes and/or to alleviate controlled-environment facility personnel from doing so, such as performing automated resident check-ins through employment of biometric identification programing, in accordance with embodiments of the present systems and methods.

Controlled-environment facility environment 100 may include, or otherwise associate controlled-environment facility database 122. As illustrated, database 122 may be a part of, or otherwise associated with, controlled-environment facility administration and management system 104. For example, the resident's name, gender, address, date of birth, etc. may be stored in one or more databases (122) maintained by controlled-environment facility administration and management system 104. According to some embodiments, in addition to identification information, biometric samples (e.g., fingerprints, voice prints, iris scans, etc.) may be stored in the one or more databases 122 maintained by controlled-environment facility administration and management system 104, as biometric signatures, such that they may be used to validate the identities of residents and others. Database 122, or the like, may be configured to maintain rules implemented by controlled-environment facility administration and management system 104.

Generally speaking, database(s) 122 may include any suitable type of application or data structure that may be configured as a data repository. For example, database 122 may be configured as a relational database that includes one or more tables of columns and rows and that may be searched or queried according to a query language, such as a version of Structured Query Language (SQL). Alternatively, database 122 may be configured as a structured data store that includes data records formatted according to a markup language, such as a version of eXtensible Markup Language (XML). In other embodiments, database 122 may be implemented using one or more arbitrarily or minimally structured data files managed and accessible through any suitable type of application.

Often, within controlled-environment facilities, residents are not permitted to maintain payment methods commonly found outside the controlled-environment facility. For example, residents of a controlled-environment facility are required to forfeit any personal property including credit cards and personal checks upon entry into the controlled-environment facility. To this end, controlled-environment facility administration and management system 104, or similar functionality may maintain calling accounts, commissary account or other trust accounts for residents, employing database(s) 122, or the like.

The present systems and methods are particularly well adapted for providing automated resident check-ins using biometric identification. Embodiments of an automated check-in system for controlled-environment facility residents employ at least one biometric capture device, such as, by way of example, camera 118, 120, 124 disposed in a controlled-environment area, such as within illustrated housing area 126 of controlled-environment facility 102, configured to capture biometrics or other biometrics of residents of the controlled-environment facility in the controlled-environment area. Such biometrics may, as noted, variously include the resident's image, a recording of the resident's voice, a fingerprint scan, a thumbprint scan, a palm scan, an iris scan, voice recognition, gait analysis, heartbeat rhythm, acoustical biometrics, sound absorption of a body biometric, RF capture of a person, RF capture of reflections and/or absorptions of a person, a heat signature, or the like. In accordance with such embodiments of the present systems and methods controlled-environment facility administration and management system 104 may be configured to enroll key biometric identification features of residents of the controlled-environment facility. These enrolled key biometric features of residents of the controlled-environment facility may be stored in controlled-environment facility database 122, or the like. For example, in accordance with some embodiments of the present systems and methods, controlled-environment facility administration and management system 104 may use mug shots, fingerprint cards, motion capture, pre-recorded data, such as video or audio of a person, recorded video, recorded audio, or the like, of the residents of the controlled-environment facility to enroll key biometric identification features of residents of the controlled-environment facility.

As noted, in some embodiments at least one controlled-environment facility resident communications kiosk 110 and/or at least one personal controlled-environment facility resident media device 112 may be disposed in a controlled-environment area, such as in a resident housing area and may host (i.e. include) camera 118 or 120, and RF capture device, a device for receiving of RF signals reflected from a person and/or absorbed by a person, or other biometric capture device or mechanism. One or more resident media devices 112 may, in accordance with embodiments of the present systems and methods, provide a mobile platform for biometric capture devices such as a camera, fingerprint reader, microphone or the like, such as may be used in various controlled-environment areas, such as work areas in or out of the controlled-environment facility, recreation areas in the controlled-environment facility, dining areas in the controlled-environment facility, or the like. Controlled-environment facility administration and management system 104 may employ controlled-environment facility resident communications kiosk 110 and/or personal controlled-environment facility resident media device 112 to carry out enrolling of key biometric identification features of residents of controlled-environment facility 102

Controlled-environment facility administration and management system 104 may compare captured biometrics of the residents to the enrolled key biometric features of residents to identify the resident in captured biometrics. Some embodiments controlled-environment facility resident communications kiosk(s) 110 and/or personal controlled-environment facility resident media device(s) 112 may be employed, such as, as a part of, or in conjunction with, controlled-environment facility administration and management system 104, to carry out the comparing of captured biometrics of the residents to enrolled key biometric features of residents of the controlled-environment facility to identify the resident.

The RF capture device implements radio frequency technology to identify a person. The RF capture device detects WIFI signals from a person. These WIFI signals travel through walls to allow the RF capture device to identify a person through a wall. The RF capture device transmits wireless signals and then analyzes the reflections and/or absorption of those signals to piece together a human form. The RF capture device can identify a person through such biometrics as RF absorption changes due to breathing patterns and heart rate or RF attenuation due to areas of increased body mass.

The RF Capture device may be positioned to detect the radio waves reflected from a person and/or absorbed. The RF capture device detects signals through walls allowing for increased flexibility as to placement of the RF capture device. In one embodiment, the RF capture device may be implemented in a controlled environment facility, such as a home for home incarceration.

The RF capture device may track multiple inmates within a controlled environment facility at the same time. The system tracks persons identified by biometrics within a 3D space by one or more biometric devices deployed in and/or around the space. The RF capture device of one embodiment implements multiple WIFI access points, multiple WIFI receivers, WIFI receivers within mobile electronic devices, multiple microphones, and/or multiple microphones within mobile electronic devices. As persons move between WIFI emitters and receivers, the system indicates the person's position by detecting the changes to the received signal levels. Additional sensors of the system measure acoustic signals or optical information that the system correlates with the RF data to provide even higher fidelity location and biometric data. Historical readings from the RF capture devices can be used by the system to eliminate static obstacles like furniture or walls from interfering with RF measurements by performing a comparison between current RF measurements and historical expectations of the RF measurements. With enough RF emitters and receivers in the monitored space, higher resolutions of a person's position can be obtained, including exact positioning of torso, arms, legs, and head within the monitored area.

In one embodiment, the biometric capture device captures biometrics to identify an individual via electromagnetic identification using sources such as WIFI. Such a capture device includes, but is not limited to, a biometric sensor deployed in an individual's residence that monitors the individual's presence in the space without an ankle bracelet often used today for home incarceration. Such an electromagnetic identification sensor enables tracking of multiple inmates within an environment, such as a jail or other controlled environment facility, at the same time.

Presence of the identified resident is logged as in the controlled-environment area, such as in illustrated housing area 126 of controlled-environment facility 102, at a time the biometrics of the identified resident were captured, as an automated check-in, which may be stored in database 122, or the like. This logging may be carried out by controlled-environment facility administration and management system 104. However, in some embodiments controlled-environment facility resident communications kiosk(s) 110 and/or personal controlled-environment facility resident media device(s) 112 may carry out the logging of presence of an identified resident as in the controlled-environment area at a time the biometrics of the identified resident were captured as a check-in, such as on controlled-environment facility administration and management system 104. This logging of the presence of the resident whose biometrics were captured as in the controlled-environment area may include logging other biometric information of the resident and the resident's physical location within the controlled-environment area, such as by a controlled-environment facility resident communications kiosk (110) and/or a personal controlled-environment facility resident media device (112).

In accordance with some embodiments, the biometric capture device(s) (e.g. camera(s) 118, 120 and/or 124, the RF capture device, or other biometric capture device) disposed within a controlled-environment area (housing area 126 of controlled-environment facility 102), and/or at least one other biometric capture device disposed in, or in conjunction with, the controlled-environment facility may capture biometrics of officers of controlled-environment facility 102. In such embodiments, controlled-environment facility administration and management system 104, or the like, may have enrolled key biometric features of officers of the controlled-environment facility, storing the enrolled key biometric identification features of officers of the controlled-environment facility in controlled-environment facility database 122, or the like. Controlled-environment facility administration and management system 104, or the like, may compare captured biometrics of an officer to enrolled key biometric features of officers of the controlled-environment facility to identify the officer, and log presence of a thus identified officer as being in the vicinity of the biometric capture device at a time the biometrics were captured (in database 122, or the like) for future reporting.

FIG. 2 is a flowchart of example process 200 for automated resident check-ins in controlled-environment areas using biometric identification, in accordance with some embodiments. This computer implemented method for automated check-in of controlled-environment facility residents, such as may be implemented by one or more controlled-environment facility systems, employs a biometric capture device (e.g. camera 118, 120, 124, device, or other biometric capture device, etc.) disposed in a controlled-environment area (e.g. within a housing area 126 of a controlled-environment facility 102). At 202 key biometric features of residents of the controlled-environment facility are enrolled. This enrolling of key biometric features of residents of the controlled-environment facility may be is carried out using mug shots of the residents of the controlled-environment facility, and/or it may be a defined enrollment process. Regardless, the enrollment process may be carried out at intake of the resident into the controlled-environment facility. Alternatively (or additionally) the enrollment process may be automated and carried out by a controlled-environment facility resident communications kiosk (110) or a personal controlled-environment facility resident media device (112) which may also host at least one biometric capture device (e.g. camera 118, 120) disposed in the controlled-environment area.

Biometrics of a resident of the controlled-environment facility are captured at 204 using a biometric capture device or mechanism disposed in the controlled-environment area. Such biometrics may include the resident's image, a recording of the resident's voice, a fingerprint scan, a thumbprint scan, a palm scan, an iris scan, voice recognition, gait analysis, heartbeat rhythm, acoustical biometrics, sound absorption of a body biometric, RF capture of a person, RF capture of reflections and/or absorptions of a person, a heat signature, or the like. Capturing the biometrics of the resident of the controlled-environment facility may be carried out at 204 during a defined check-in procedure, wherein the resident provides a biometric sample, such as by presenting his or her face to a camera of kiosk or (his or her) resident device. This capturing of biometrics of residents of the controlled-environment facility at 204 using the biometric capture device disposed in a controlled-environment area may be carried out on a (more-or-less) continual basis At 206, the resulting captured biometrics of the resident is compared to enrolled key biometric features of residents of the controlled-environment facility to identify the resident. As noted, the biometric capture device or mechanism disposed in a controlled-environment area may be a part of a controlled-environment facility resident communications kiosk and/or a part of a personal controlled-environment facility resident media device (i.e. a mobile computing device). In such embodiments the controlled-environment facility resident communications kiosk and/or the personal controlled-environment facility resident media device may capture the biometrics at 204 and carry out comparison of resulting captured biometrics of the resident to enrolled key biometric features of residents of the controlled-environment facility to identify the resident at 206.

Regardless of the means of capture, presence of the resident whose biometrics were captured is logged at 208 as being in the controlled-environment area at a time the biometrics were captured with a controlled-environment facility administration and management system (104), as a check-in. Further, in embodiments where controlled-environment facility resident communications kiosk and/or the personal controlled-environment facility resident media device captures the biometrics at 204 and carries out comparing resulting captured biometrics of the resident to enrolled key biometric features of residents at 206, the controlled-environment facility resident communications kiosk and/or the personal controlled-environment facility resident media device may carry out the logging at 208. In such embodiments, the controlled-environment facility resident communications kiosk and/or the personal controlled-environment facility resident media device may log the resident's presence in the controlled-environment area, with the controlled-environment facility administration and management system, as a check-in.

Moreover, this logging of the presence of the resident whose biometrics were captured as in the controlled-environment area at 208 may include logging other biometric information of the resident (captured by the controlled-environment facility resident communications kiosk or a part of a personal controlled-environment facility resident media device). The resident's physical location within the controlled-environment area may also be logged at 208, such as at a particular controlled-environment facility resident communications kiosk or based on a (GPS, WIFI, etc.) derived location of the personal controlled-environment facility resident media device. Where biometrics of residents of the controlled-environment facility are captured at 204 on a continual basis, logging presence of residents captured in the biometrics at 208 as being in the controlled-environment area may be carried out periodically, such as, as check-ins at predetermined times.

In accordance with embodiments of the present systems and methods a prompt may be issued for the resident to present his or her self before a biometric capture device face in front of the camera, or otherwise provide a biometric sample, in response to the resident not having a valid check-in logged within a predefined period, such as may be as defined by controlled-environment facility rules, such as may be administered by the controlled-environment facility administration and management system (104). This prompt may be an email, text, alarm, phone call, other electronic, optical or acoustic signals, etc., issued to a controlled-environment facility resident communications kiosk (110) in the controlled-environment area and/or a personal controlled-environment facility resident media device (112) of the resident in question. Additionally or alternatively, the prompt may (also) take the form of an announcement issued over a public address system of the controlled-environment facility. In accordance with some embodiments of the present systems and methods, such prompts may additionally or alternatively be issued at specified intervals, according to facility rules, to perform required check-ins. Further in this regard, concurrent with, in lieu of, or following an unheeded prompt for the resident to present his or herself before a biometric capture device, an alert may be issued, such as to a controlled-environment facility official, or the like, that facility rules for required check-ins have been violated with regard to the subject resident. This alert may be an email, text, alarm, phone call, or the like, issued to the controlled-environment facility official, or similar party.

In one embodiment, the present invention issues dynamically generated prompts to the person. The system evaluates the person's response for content and voice pattern to determine identity. The dynamically generated prompts vary to increase the accuracy of identifying the person without allowing others to impersonate the desired person.

An additional or alternative embodiment calls for enrolling key biometric features of officers of the controlled-environment facility and capturing a biometrics of an officer of the controlled-environment facility using a biometric capture device or mechanism disposed in, or in conjunction with, the controlled-environment facility. The resulting captured biometrics of the officer may then be compared to enrolled key biometric features of officers of the controlled-environment facility to identify the officer. Whereupon, presence of an identified officer may be logged as in the vicinity of the biometric capture device at a time the biometrics were captured. Reports of where the identified officer was at predetermined times (throughout the day) may be generated from these logs. Embodiments of the present systems and methods may also be used in emergencies to identify the last known location for a person in a controlled-environment facility. For example, during riots, this system could identify which officers were present in dangerous areas, and the like.

Various elements of the present systems and methods for automated resident check-ins in controlled-environment areas using biometric identification may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware. Thus, embodiments of the present systems and methods for automated resident check-ins in controlled-environment areas using biometric identification, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIGS. 1 and 2. A computer system such as computer system 300 may be a part of controlled-environment facility communications environment 100, such as a part of correctional facility inmate communications management system 106, which may include further components to provide the afore discussed communications functionality. A computer system such as computer system 300 may be used as part of correctional facility administration and management system 104, communications kiosk 110, personal inmate media devices 112, etc. In various embodiments two or more of these computer systems may be configured to communicate with each other in any suitable way, such as, for example, via a network, via a local area network, using wireless functionality and/or the like.

As illustrated, example computer system 300 includes one or more processors 310 coupled to a system memory 320 via an input/output (I/O) interface 330. In some embodiments, at least one processor 310 may be a tensor processing unit (TPU) or other dedicated machine learning device. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

FIG. 4 shows an event detection feature of one embodiment of the present invention. The system defines the conditions to be detected to determine a particular event. The system identifies parameters that define an event at Step 400. Such parameters may include elevated heart rate, detection of suspicious activity, detection of potential medical emergencies, gathering of multiple inmates, gathering of particular individuals within a close proximity, detection of particular body positions, detection of an inmate in a specified location, detection of an inmate in a location for a predetermined time, detection of a gathering of inmates for a predetermined time, volume of sound detected, tone of sound detected, and other events.

The biometric capture device monitors the controlled environment facility detecting the inmates within a particular area. The system captures the identity of the inmate and the location of the inmate. The system also monitors the conditions of the controlled environment facility at Step 402 via capturing devices installed within the system. Such capturing devices may include, but are not limited to, cameras, microphones, audio transducers, motion capture devices, RF capture device, biometric capture device, health monitors, etc.

In one embodiment, the system implements an array of capturing devices, as discussed above, that monitor the facility. The capturing devices communicate with the computer system, such as a server, to collect the condition information needed to compare to the parameters to detect the occurrence of an event. The capturing devices create a network that detects conditions throughout the facility.

In one embodiment, the capturing network includes capturing devices installed within the facility and the mobile computing devices, including but not limited to the personal resident media devices, such as the tablets, and facility personnel devices. The personal resident media device provides a camera, a microphone, a network connection, etc. that transmits information to the computer system. Such data collected by the personal resident media device provides the system with location information, video and audio, user data such as information accessed by the resident and the identify of the user who accessed the personal resident media device.

In one embodiment, the WIFI signals from mobile electronic devices and network access points in or near the monitored space provide the biometric detection network. The signals are collected by one or more devices and analyzed to identify persons within the space and to calculate positions based on the frequency, strength, and other characteristics of the radio frequency energy detected.

In one embodiment, the microphones from mobile electronic devices in or near the monitored space serve as a component of the biometric detection network. Combinations of sensors such as WIFI, microphones, accelerometers, and cameras used as a combined biometric detection network can also serve as a component of the biometric detection network.

In some embodiments, a machine learning system such as a neural network processes information from the biometric detection network to determine if an event is taking place. The machine learning system of such an embodiment is trained to identify generic events or trained specifically for the environment where the system is deployed. For example, a machine learning system might be trained to ignore animals or machinery present within the monitored environment.

In one embodiment, an inmate might check out a personal resident media device, including but not limited to a tablet, from a tablet checkout station available in or near the monitored space of the facility. The inmate enters an identifier and passcode and a tablet is released from the system for the inmate's use. As the inmate walks away with the tablet, a microphone in the tablet identifies footsteps by the acoustic signature and accelerometer readings for the tablet. Since the inmate was strongly identified at the time of tablet check out, the inmate's height is known and can be used to calculate an approximate distance away from the checkout station.

At the same time, the WIFI signal strength from dozens of other tablets in and near the monitored space are being collected and the drop in WIFI signal at some locations is correlated to the inmate's passing between a WIFI source and a receiver and absorbing some WIFI energy. Likewise, the microphones from dozens of other tablets monitor the sounds and identify footsteps which occur in time correlated sequence with the inmate's tablet recordings.

From this correlation of recordings and the volume and delay of the footstep recording at the other tablets, the system determines the other tablets that are in proximity to the monitored inmate and estimates how far away the inmate currently is from each sensor in the biometric detection network. A machine learning system of one embodiment receives the data from all these sources and even more strongly identifies inmate positioning. When a second monitored inmate approaches the first inmate, the biometric detection network can identify both uniquely and measure the time spent within a predetermined distance of one another.

Likewise, the system could record conversations between the first and second inmate with high confidence in identity even if cameras are not present at the time of the conversation. These recordings could be saved and searched for court cases as needed by jail staff. The system can analyze conversation content to search flagged words, sentiment, or intent.

The system constantly monitors conditions of the inmates and the conditions of the controlled environment facility. The system compares these detected conditions to the parameters that define the occurrence of an event. Such conditions that the system detects may include, but are not limited to:

Reporting of inmates in close proximity to one another;

Alerts based on inmate interaction based on rules including closeness, time together, activity;

Alerts if rape or other undesired physical contact between individuals is detected;

Determination of gang affiliation based on contact between individuals;

Recommendations of housing changes based on interactions between individuals;

Alerts based on suspicious activity—too many inmates congregating, spending too much time in secluded areas, standing on furniture, posture indicates self-harm like hanging;

Alerts if activity indicates fights—elevated heart rates, body positions, angry expressions, shouting, etc.;

Alerts based on content of conversations between individuals; and

Alerts based on physical communication between individuals, for example gang signs, salutes, hand shakes, fist bumps, high fives, winks, nods, pointing, head motions, mouth movements, etc.

The system monitors such conditions by identifying individuals and the locations of the individuals. The system monitors the period of time that such individuals continue to occupy a particular space. The system also monitors the conditions of the inmates such as body position or other physical activities captured by the RF Capture or other motion capture device. The system also monitors the physical and health conditions of the inmates. Such monitoring includes but is not limited to body temperature, heart rate, rate of breathing, etc.

In one embodiment, the system defines a designated area within the facility that is a specified portion of the facility, which may be smaller than the entire facility. The system tracks the amount of time a person spends within the designated area. The system may generate an alarm for spending a predetermined amount of time within the area. The system may reward the person by crediting the person's account. They system may also charge a person for spending time in the designated area.

The system defines parameters such as number of inmates within a particular area, selected inmates within a particular area, extended stay of inmate or inmates within a particular time, time that inmates spend together, volume of sound detected, detected decibels of sound, detected speech via speech recognition, activity or body positioning of inmates detected via motion capture or RF capture. The system may also monitor health conditions of the inmates such as heart rate, body temperature, etc. to determine if an event is occurring.

The system captures the conditions at the facility. The system then compares the detected conditions to the defined parameters to determine if an event has occurred. The facility may define the parameters or the parameters may be defined by others. If the detected conditions meet the defined parameters, an event has been detected at event detected query 404. If the conditions do not meet the parameters, the system determines that no event has been detected and continues to monitor conditions.

If an event has been detected, the system alerts users that an event has occurred at Alert step 406. The system may alert the users via an audible alarm, a visual alarm, etc. The system may also transmit a message to users or other alert to warn the detection of an event. The system continues to monitor conditions after activating the alert.

The system also provides for health monitoring of the inmates by detecting health events similar to the process shown in FIG. 4. The system collects biometric information and sends the information to medical staff and systems for medical diagnosis and evaluation. The system alerts the medical staff, first responders, administration, etc., if the detected biometric information indicates possibly dangerous medical conditions, such as heart attack.

The system of one embodiment also connects to external systems. Such connection enables sharing of information with other systems or third parties. The system may connect to a billing system that automatically bills individuals for time in or out of a space or a particular location.

The system of one embodiment also connects to a good behavior system which automatically credits individuals for time spent in or out of a space or a particular location.

The system of one embodiment also connects to a communication routing network that automatically routes a person's phone calls, video calls, electronic messages, etc. to electronic devices where the inmate has been recently identified. The system detects the individual and the location of the individual. The biometric capture device identifies the user to enable the system to direct the communication to the location at which the user is located.

The system of one embodiment connects to a housing tracking system that automatically updates a person's housing location based on locations where the person has been recently identified.

The system of one embodiment connects to a monitoring system that enables enhanced monitoring of a space when a specific individual enters the space. The system activates additional monitoring of a particular location upon detection of a particular inmate. In one embodiment, the system alerts the facility to implement additional resources, such as guards or other personnel to the location.

The system of one embodiment connects to surveillance information that can be correlated to a person's location using the biometric information provided.

The system of one embodiment connects to other systems to affect the features of the system. The system of one embodiment enables and/or disables features within other systems based on biometric check-in data. For example, disabling password-only authentication for kiosks if a biometric check-in has not been successful in the housing area for a certain period of time.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An event detection system for identifying a person and an event occurring within an area of a controlled environment facility, the system comprising:
   at least one biometric capture device disposed in the facility to capture biometrics of at least one person within the area;
   compare captured biometrics of the person to an enrolled key biometric identification feature to identify the person;
   identify event parameters that define the event;
   a capturing device that monitors environmental conditions within the facility, wherein the capturing device monitors audio or visual conditions;
   a computing system that compares the environmental conditions to the event parameters associated with the event to identify an occurrence of the event;
   wherein the computing system associates the person identified by the biometric capture device with the event; and
   the computing system generating an alert if the environmental conditions meet the event parameters, wherein the alert notifies a recipient of the occurrence of the event.

2. The system of claim 1, wherein the system is further configured to input a recorded video of the person of the facility to enroll the key biometric identification feature of the person of the facility.

3. The system of claim 1, wherein the system is further configured to input a recorded heartbeat rhythm of the person of the facility to enroll the key biometric identification feature of the person of the facility.

4. The system of claim 1, wherein the system is further configured to input acoustical biometrics of the person of the facility to enroll the key biometric identification feature of the person of the facility.

5. The system of claim 1, wherein the system is further configured to input sound absorption of a body biometric of the person of the facility to enroll the key biometric identification feature of the person of the facility.

6. The system of claim 1 further comprising:
   the biometric capturing device coupled to a computing device wherein the computing device collects data concerning conditions of the facility, the biometric capture device providing location data that identifies the location of the person within the area.

7. The system of claim 1 wherein the system identifies a person via electromagnetic identification.

8. The system of claim 1 wherein a microphone serves as the biometric capturing device.

9. The system of claim 1 further comprising:
   defining a designated area within the facility wherein the designated area is a smaller portion of the facility;
   tracking an amount of time a person spends within the designated area.

10. The system of claim 1, wherein the biometric capture device identifies at least two people within the area, wherein the event parameters identify that the two people should not be within the area, wherein the computing system alerts the recipient of the event upon detection of the event.

11. The system of claim 1, wherein the biometric capture device identifies at least two people within a predetermined distance, wherein the event parameters identify that the two people should not be within the predetermined distance, wherein the computing system alerts the recipient of the event upon detection of the event.

12. The system of claim 1, the capturing device captures audio of a restricted word, wherein the event parameters identify the restricted word, wherein the computing system alerts the recipient of the event upon detection of the event.

13. The system of claim 1, wherein the capturing device captures an action taken by the person that matches the event parameters associated with the event, wherein the computing system alerts the recipient of the action upon detection of the event.

14. The system of claim 1, the capturing device captures audio exceeding a restricted decibel level, wherein the event parameters identify the restricted decibel level, wherein the computing system alerts the recipient of the event upon detection of the event.

15. An event detection system for identifying a person and an event occurring within an area of a controlled environment facility, the system comprising:
   at least one biometric capture device disposed in the facility to capture biometrics of at least one person within the area;
   compare captured biometrics of the person to an enrolled key biometric identification feature of people of the facility to identify the person;
   identify event parameters that define the event;
   a capturing device that monitors environmental conditions within the facility, wherein the capturing device monitors audio or visual conditions; and
   a computing system that compares the environmental conditions to the identified parameters to identify an occurrence of the event;
   wherein the computing system associates the person identified by the biometric capture device with the event; and
   the computing system generating an alert upon identifying that the environmental conditions meet the event parameters, wherein the alert notifies a recipient of the occurrence of the event upon detection of the event, wherein the alert identifies the person identified by the biometric capture device.

16. The system of claim 15 further comprising:
   associating a person with the occurrence of the event; and
   wherein the alert is a message, the message identifying the person associated with the event and a location at which the event occurred.

17. The system of claim 15 wherein the alert is an audible alarm.

18. The system of claim 15 wherein the alert is a text message.

19. An event detection system for identifying a person and an event occurring within an area of a controlled environment facility, the system comprising:
- at least one biometric capture device disposed in the facility to capture biometrics of at least one person within the area;
- compare captured biometrics of the person to an enrolled key biometric identification feature of people of the facility to identify the person;
- identify event parameters that define the event;
- a capturing device that monitors environmental conditions within the facility, wherein the capturing device monitors audio or visual conditions;
- a computing system that compares the environmental conditions to the event parameters to identify an occurrence of the event;
- identifying a person associated with the event;
- wherein the computing system associates the person identified by the biometric capture device with the event; and
- the computing system generating an alert upon identifying of the occurrence of the event, wherein the alert notifies a recipient upon detecting the occurrence of the event by the environmental conditions meeting the event parameters, wherein the alert indicates the location of the event.

20. The system of claim 19, wherein the capturing device captures an action taken by the person that matches the event parameters associated with the event, wherein the alert received by the recipient identifies the action.

21. The system of claim 19, wherein the capturing device captures a health emergency of the person that matches the event parameters associated with the event, wherein the alert received by the recipient identifies the health emergency.

22. The system of claim 19, wherein the biometric capture device identifies at least two distinct people within the area that meet the event parameters, wherein the computing system alerts the recipient that the two distinct people are within the area.

23. The system of claim 22, wherein the biometric capture device identifies at least two people within a predetermined distance that meet the event parameters, wherein the computing system alerts the recipient of the two distinct people within the predetermined distance.

24. The system of claim 22, wherein the capturing device captures conversation between the identified individuals, wherein the conversation comprises a word identified in the event parameters, wherein the computing system alerts the recipient of the event upon detection of the event.

25. The system of claim 19, wherein the capturing device captures a person's spatial position in a designated location that meets the event parameters, wherein the computing system alerts the recipient of the event upon detection of the event.

26. The system of claim 19, wherein the capturing device captures a person's arm and leg positions that meets the event parameters, wherein the computing system alerts the recipient of the event upon detection of the event.

27. The system of claim 19, wherein the capturing device captures a person's body position that meets the event parameters, wherein the computing system alerts the recipient of the event upon detection of the event.

* * * * *